(12) United States Patent
Smolarek et al.

(10) Patent No.: US 6,344,069 B2
(45) Date of Patent: Feb. 5, 2002

(54) SYSTEM FOR ENERGY RECOVERY IN A VACUUM PRESSURE SWING ADSORPTION APPARATUS

(75) Inventors: James Smolarek, Boston; Michael John Sinicropi, Cheektowaga; Herbert Raymond Schaub, East Amherst, all of NY (US)

(73) Assignee: Praxair Technology, Inc., Danbury, CT (US)

( * ) Notice: Subject to any disclaimer, the term of this patent is extended or adjusted under 35 U.S.C. 154(b) by 0 days.

(21) Appl. No.: 09/753,612

(22) Filed: Jan. 4, 2001

Related U.S. Application Data

(62) Division of application No. 09/264,812, filed on Mar. 9, 1999, now abandoned, which is a continuation of application No. 08/791,308, filed on Jan. 30, 1997, now Pat. No. 5,912,426.

(51) Int. Cl.[7] ............................................. B01D 53/047
(52) U.S. Cl. ............................ 95/96; 95/101; 95/102; 95/130
(58) Field of Search ......................... 95/96–106, 130, 95/138; 96/115, 130, 133, 143, 144

(56) References Cited

U.S. PATENT DOCUMENTS

| | | | | |
|---|---|---|---|---|
| 2,101,555 A | * | 12/1937 | Moore et al. | 98/115 |
| 2,237,684 A | * | 4/1941 | Moore | 96/115 X |
| 2,248,225 A | * | 7/1941 | Fonda | 96/160 X |
| 3,740,928 A | * | 6/1973 | Schmid | 96/130 X |
| 4,449,990 A | * | 5/1984 | Tedford, Jr. | 96/115 X |
| 4,534,346 A | * | 8/1985 | Schlaechter | 96/144 X |
| 4,732,579 A | * | 3/1988 | Veltman et al. | 96/130 X |
| 4,810,265 A | * | 3/1989 | Lagree et al. | 95/101 |
| 4,892,566 A | * | 1/1990 | Bansal et al. | 96/115 X |
| 4,995,889 A | * | 2/1991 | Abel et al. | 55/21 |
| 5,042,994 A | * | 8/1991 | Smolarek | 55/18 |
| 5,096,469 A | * | 3/1992 | Keefer | 55/25 |
| 5,183,483 A | * | 2/1993 | Servido et al. | 96/130 X |
| 5,203,889 A | * | 4/1993 | Brown | 96/115 |
| 5,256,172 A | * | 10/1993 | Keefer | 96/115 X |
| 5,298,054 A | * | 3/1994 | Malik | 96/133 X |
| 5,403,384 A | * | 4/1995 | Faul et al. | 96/115 X |
| 5,429,666 A | * | 7/1995 | Agrawal et al. | 95/101 |
| 5,518,526 A | * | 5/1996 | Baksh et al. | 95/100 |
| 5,912,426 A | * | 6/1999 | Smolarek et al. | 96/115 |

FOREIGN PATENT DOCUMENTS

| | | | | |
|---|---|---|---|---|
| JP | 01-304024 | * | 12/1989 | 96/130 |
| JP | 05-345111 | * | 12/1993 | 96/130 |

* cited by examiner

Primary Examiner—Robert H. Spitzer
(74) Attorney, Agent, or Firm—Robert J. Follett

(57) ABSTRACT

A VPSA apparatus includes a first adsorbent bed and a second adsorbent bed, a feed blower for providing a flow of a gas mixture at about atmospheric pressure to the beds, and a vacuum blower for removing a flow of gas therefrom and venting the gas to a space at atmospheric pressure. The VPSA process causes the first adsorbent bed to be poised for evacuation by the vacuum blower and concurrently, the second adsorbent bed is under vacuum conditions and is poised for pressurization by the feed blower. A single motor is coupled by a common shaft to both the feed blower and the vacuum blower and operates both. A conduit/valve arrangement is operative during at least a portion of a process time when the adsorbent beds are in pressurizing/evacuation states, respectively, to couple the feed blower to the second adsorbent bed when at vacuum and for concurrently coupling the vacuum blower to the first adsorbent bed which is to be evacuated. The feed blower is thereby caused to operate in a gas expansion mode and imparts expansion energy, via the common shaft, to the vacuum blower. During idling conditions, a valve-conduit system is controlled to enable significant reductions in pressure rise across the feed and vacuum blowers.

2 Claims, 2 Drawing Sheets

SYSTEM FOR ENERGY RECOVERY IN A VACUUM PRESSURE SWING ADSORPTION APPARATUS

This is a Division of prior U.S. application(s) Ser. No. 09/264,812 Filing Date: Mar. 9, 1999, now abandoned, and which in turn is a Continuation of application Ser. No. 08/791,308 Filing Date Jan. 30, 1997, now U.S. Pat. No. 5,912,426.

FIELD OF THE INVENTION

This invention relates to apparatus for separation of a preferred gas such as oxygen, from a mixture of the preferred gas and other gases and, more particularly, to gas separation apparatus which employs a vacuum pressure swing adsorption (VPSA) process and recovers energy from blowers employed by apparatus that performs the VPSA process.

BACKGROUND OF THE INVENTION

VPSA processes and systems are known in the art for separating components of a feed gas mixture. Such a gas mixture contains a more readily adsorbable component (i.e., a "more preferred" gas) and a less readily adsorbable component (i.e., a "less preferred" gas), and is passed through an adsorbent bed capable of selectively adsorbing the more readily adsorbable component at an upper adsorption pressure. The bed is thereafter depressurized to a lower desorption pressure (e.g. a vacuum) for desorption of the more readily adsorbable component and its removal from the bed prior to introduction of additional quantities of the feed-gas mixture. In a multiple bed VPSA system, the beds are cyclically operated through the same series of process steps, but the step sequence in one bed is offset from the same step sequence applied to another bed. The step sequence offset is accomplished to allow use of common feed and exhaust systems and to achieve process and energy savings.

In conventional VPSA systems, multiple adsorber beds are commonly employed, with each bed subjected to a VPSA processing sequence on a cyclic basis so as to enable efficiencies to be achieved. VPSA systems are often used to separate oxygen from an input air stream. At certain times during operation of a VPSA system, either a feed blower or a vacuum blower, or both, are caused to operate in an "idle" mode, where they do not interact with associated adsorbent beds to actively move feed or exhaust gas through the system. Such operation is hereafter referred to as the unload state. The term turndown state will hereafter be used and will refer to the condition when: both the feed and vacuum blowers are set into the unload state (idling) for an extended period of time; and the VPSA system is not producing product.

During the VPSA process, gas streams are frequently expanded when pressure is transferred during the process. Such gas transfer takes place at both the product and feed ends of the adsorber bed. Energy recovery from expanding gas streams in VPSA processes has long been a goal in systems design.

Most present VPSA systems and, in particular, two-bed systems incorporate process steps which throttle gas streams for the purpose of pressure transferring the gas. The throttling results in lost power and added inefficiencies. Energy recovery in the prior art has also employed a natural aspiration of the feed air during vacuum conditions, at the beginning of the VPSA cycle. The natural aspiration method requires an additional air inlet regulation system and results in only a modest reduction in the feed gas compression requirement. Nor does the aspiration system recover energy from the expanding stream, but rather merely provides an air inlet without additional power consumption.

Other prior art teachings related to energy recovery in gas separation systems are as follows. U.S. Pat. No. 5,429,666 to Agrawal et al. describes a vacuum swing adsorption (VSA) process which employs two beds that operate with product pressurization and pressure equalization between the beds. Simultaneous operation of the process steps, for the purpose of continuous utilization of feed and vacuum blowers, is described. The Agrawal et al. process employs a natural aspiration of feed air as an energy recovery process. The system attempts to lower feed power by utilizing the low adsorber bed pressure at the beginning of a cycle to allow for some fraction of the feed air to be drawn directly into the bed, without need for an air compressor. Such an ambient feed does nothing to recover energy that is available from the expansion of the feed air.

U.S. Pat. No. 4,995,889 to Abel et al. describes a method for regulating product flow of an adsorption air separation system, especially under conditions of discontinuous product flow that result from variable customer demand. A control valve is connected to the product line of the separation apparatus and controls flow of the product through a variable or fixed orifice device that is upstream of the control valve. A differential pressure controller, which senses pressure upstream and downstream of the orifice device, is used to operate the control valve.

U.S. Pat. No. 5,096,469 to Keefer details an adsorption air separation process which utilizes oscillations of a liquid column to change the volume of variable displacement chambers in order to create cyclic pressure changes that are required for the pressure swing process. In effect, the inertia of the oscillating fluid provides an energy exchange between air separation chambers.

U.S. Pat. No. 5,183,483 to Servido et al. describes a pneumatic control process for a pressure swing adsorption (PSA) process. Adsorption, desorption and equalization phases are connected through use of two 3-way valves and a single compressor. By controlling the operation of the 3-way valves, the compressor can be used for adsorption and desorption or can be allowed to operate unloaded as well.

U.S. Pat. No. 5,518,526 to Baksh et al. describes a PSA process which overlaps various steps to reduce total cycle time and to achieve improved efficiency and productivity. A unique step is described as being the simultaneous evacuation of a bed undergoing an equalization rising step, while the other bed is undergoing an equalization falling step. The next step in the cycle is simultaneous product and feed pressurization at opposite ends of the bed, followed by feed pressurization to the desired adsorption pressure.

U.S. Pat. No. 5,042,994 to Smolarek (Applicant herein) describes a method for controlling a PSA system by the monitoring of a variable volume storage vessel during nitrogen production applications. The process cycle contains two steps where the feed blower and vacuum blower are idle. The first step is a counter-current oxygen repressurization step of a previously desorbed bed, while an adsorbed bed undergoes a blow-down of product nitrogen. The second step when the process machines are idled and not utilized occurs during a turndown step when the level of the variable volume product storage vessel is monitored in order to determine variations in customer demand. Thus, Smolarek teaches that the measure of idle time is proportional to some measure of customer demand. Smolarek further mentions that power reduction and energy savings can be achieved under turndown conditions by idling the machines proportionally with customer demand, while maintaining product purity.

Notwithstanding the substantial development efforts that have been directed at improvements of pressure swing adsorption (PSA) and VPSA processes and systems, there is a continuing need for efficiency improvements therein.

Accordingly, it is an object of this invention to provide a pressure swing adsoption system which exhibits energy usage efficiencies.

SUMMARY OF THE INVENTION

A VPSA apparatus includes a first adsorbent bed and a second adsorbent bed, a feed blower for providing a flow of a gas mixture at about atmospheric pressure to the beds, and a vacuum blower for removing a flow of gas therefrom and venting the gas to an area of atmospheric pressure. The VPSA process causes the first adsorbent bed to be poised for evacuation by the vacuum blower and concurrently, the second adsorbent bed is under vacuum conditions and is poised for pressurization by the feed blower. A single motor is coupled by a common shaft to both the feed blower and the vacuum blower and operates both. A conduit/valve arrangement is operative during at least a portion of a process time when the adsorbent beds are in pressurizing/ evacuation states, respectively, to couple the feed blower to the second adsorbent bed when at vacuum and for concurrently coupling the vacuum blower to the first adsorbent bed which is to be evacuated. The feed blower is thereby caused to operate in a gas expansion mode and imparts expansion energy, via the common shaft, to the vacuum blower.

A further embodiment of the invention includes additional conduits and valves which couple the feed conduit from the feed blower to the exhaust conduit input to the vacuum blower. When the system is in a turndown state, the adsorbent beds are isolated from the vacuum blower and both the feed blower and vacuum blower are idling and in the unload state. In such condition, the valving is operated to enable the feed blower to exhaust its air flow via the exhaust conduit, thereby resulting in lower pressure drops across both the feed and vacuum blowers.

A further, less preferred embodiment, uses independent motors to power the feed and vacuum blowers but, during turndown, couples the feed blower to the second adsorbent bed (which is at vacuum), causing the feed blower to be operated in a gas expansion mode. A generator is coupled to the feed blower motor and generates electrical energy into the main, thereby creating a credit for energy which is either later or concurrently used to power the vacuum blower.

DETAILED DESCRIPTION OF EMBODIMENTS OF THE INVENTION

Figure 1:
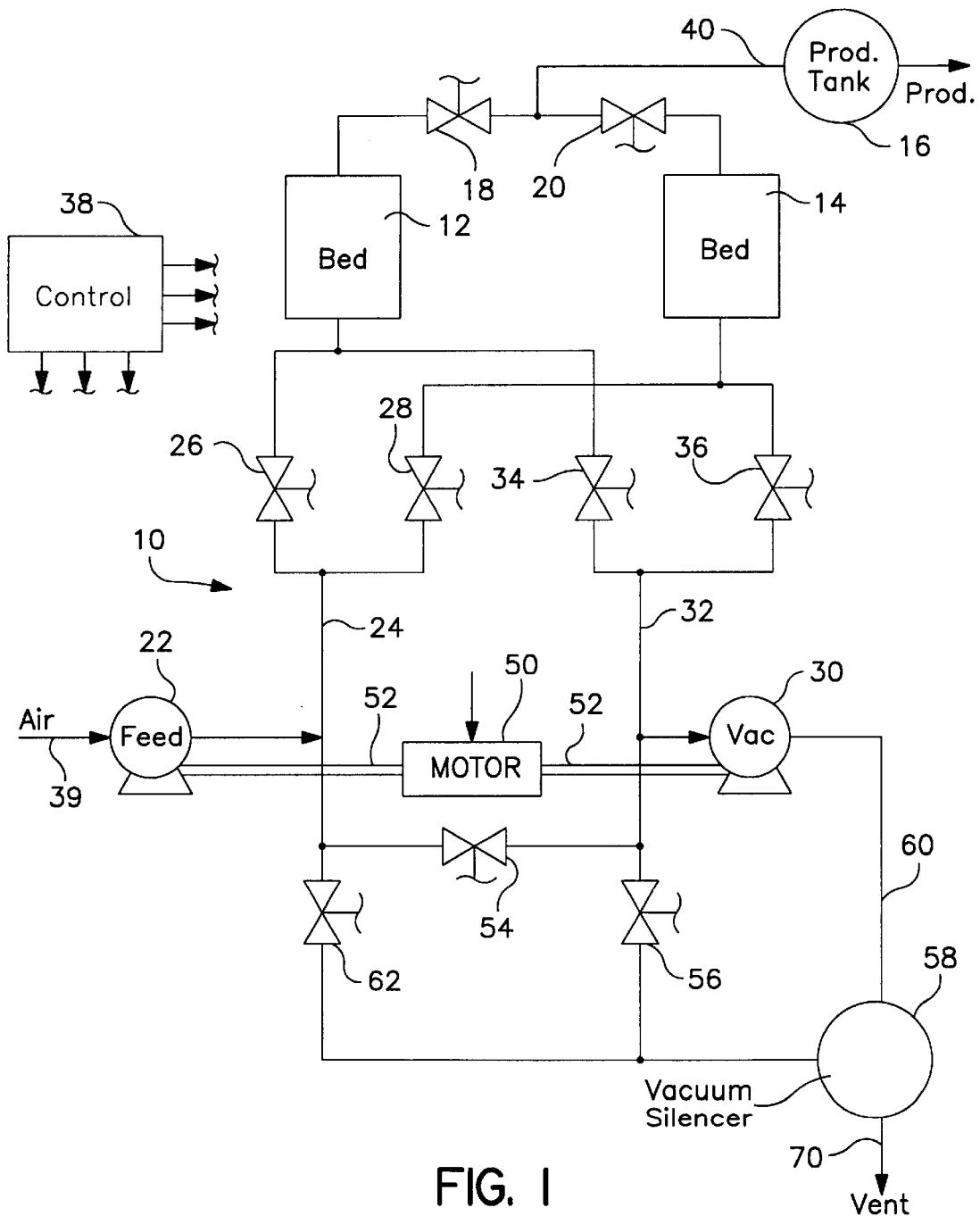
FIG. 1 is a schematic diagram illustrating a VPSA system embodying the preferred mode of the invention.

As will be hereafter understood, the preferred embodiment of the invention shown in FIG. 1 is configured to enable a VPSA system 10 to recover energy that is associated with expanding air streams and to deliver that energy directly to a vacuum blower. VPSA system 10 comprises a pair of adsorbent beds 12 and 14 which are coupled to an output product tank 16 via control valves 18 and 20, respectively.

It is to be understood that while the description hereafter will only consider adsorbent beds 12 and 14, the system can be configured with additional beds, as is known in the prior art. Further, the system will be described in the context of an air separation process, however, it is known that pressure swing gas separation systems can be applied to other separations where a more preferred gas and/or a less preferred gas is separated, and provided as product, from a mixture of the more preferred gas and a less preferred gas. In the example to be described below, it is the less preferred gas (oxygen) that is output as product (with the adsorbent beds be selective for nitrogen). Accordingly, the invention is to be considered as applicable to all processes wherein appropriate gases are separated.

A feed blower 22 is coupled via a feed conduit 24 and feed valves 26 and 28 to beds 12 and 14, respectively. A vacuum blower 30 is coupled via an exhaust conduit 32 and exhaust valves 34 and 36 to adsorbent beds 12 and 14, respectively. A controller 38 enables operation of each of the aforesaid components in the known manner to enable a separation of an inlet air feed 39 into an oxygen output stream (via conduit 40) feed to product tank 16 for storage.

Feed blower 22 and vacuum blower 30 are both operated by a motor 50, which is coupled to both thereof by common shaft 52. By this arrangement, as will be described in further detail below, when feed blower 22 operates in an air expansion mode, the expansion energy which results is transferred via shaft 52 to vacuum blower 30, thereby enabling the electrical power input into motor 50 to be reduced, while enabling vacuum blower 30 to maintain its level of operation, albeit at a lower energy cost.

A first unload valve 54 is coupled between feed conduit 24 and exhaust conduit 32 and a second unload valve 56 further couples exhaust conduit 32 to a vacuum silencer 58. Vacuum silencer 58 is further provided with a gas flow from vacuum blower 30 via vent conduit 60. Vacuum silencer 58 provides a vent action via vent conduit 60 and enables venting of both vacuum blower 30 and feed blower 22, when a control valve 62 is opened and couples feed conduit 24 to vacuum silener 58.

As will be hereinafter understood, the provision of motor 50 and common shaft 52 to connect feed blower 22 to vacuum blower 30 essentially creates an integral machine which enables vacuum blower 30 to be operated at reduced electrical power input as a result of gas expansion energy imparted to feed blower 22 during a portion of a VPSA cycle. The electrical power supplied to motor 50 during such gas expansion time is lowered in direct proportion by controller 38.

Secondarily, the piping arrangement that includes unload valves 54, 56 and 62 and their interconnection to vacuum silencer 58 allows feed blower 22 to be discharged to the suction created by vacuum blower 30 during unload periods. This action results in a decrease of the pressure rise across vacuum blower 30 and feed blower 22 during times in the cycle when the blowers are not loaded and reduces their resultant power draw.

As indicated above, VPSA systems commonly cause adsorbent beds 12 and 14 to be respectively pressurized and at a vacuum, during several process steps of the separation procedure. For example, VPSA systems employ a purge and overlap equalization cycle wherein continuous waste removal from one bed results in an expanding feed stream which produces energy simultaneously with a vacuum level waste stream requiring energy. During such action, adsorbent bed 12, for instance, remains at vacuum conditions, rising from 9–13 psi, while feed air is supplied to adsorbent bed 12 by feed blower 22. This action results in vacuum conditions being present in feed conduit 24, thereby creating expansion of the feed air during the entire step. The feed air rate must also be limited during this period, hence extraction of work by limiting the air feed flow by expansion through feed blower 22 is advantageous from a process standpoint.

Concurrently, adsorbent bed 14 must be evacuated by the operation of vacuum blower 30 through exhaust conduit 32 and vacuum silencer 58 to vent pipe 70. At such time, waste nitrogen is removed from adsorbent bed 14 and is vented via vent pipe 70 to the atmosphere. During such time, adsorbent bed 14 experiences a pressure fall into a vacuum condition (e.g., from about 16 to 13 psi).

Thus, when feed air is fed from feed air inlet 39 by feed blower 22 into feed conduit 24, the feed air is expanded and the expansion energy is imparted to feed blower 22 which, in turn, supplies mechanical power via shaft 52 to vacuum blower 30. At such time, controller 38 reduces the electrical power that is input to motor 50 in accordance with the expansion energy input from feed blower 22. Thus, motor 50 and common shaft 52 enable the expansion gas to directly transfer energy, via feed blower 22, to vacuum blower 30 which is concurrently operating in a compression mode to extract gas via exhaust conduit 32 from adsorbent bed 14.

In addition to the energy savings achieved by the aforementioned arrangement, a more compact plant layout is achieved, while at the same time reducing capital costs of the system through elimination of another drive motor and a motor starter. The single motor arrangement also simplifies the start-up controls. A common drive motor starts both blowers simultaneously, eliminating any possibility of not starting both blowers at the same time which could result in some undue loading on the machines, causing unwanted wear.

At certain times during the VPSA cycle, plant unload may be achieved by interrupting the cycling of adsorbent beds 12 and 14, by isolating the beds and venting feed blower 22 and vacuum blower 30. During loaded operation, feed blower 22 and vacuum blower 30 are loaded by transfer of gas to and from adsorbent beds 12 and 14, respectively. Feed valves 26 or 28 are either open or closed in dependence on which bed is being adsorbed. The same is true for exhaust valves 34 or 36, depending on which bed is being desorbed. During loaded operation, unload valves 54, 56 and 62 may be closed. Depending on the VPSA cycle, either or both of the feed and vacuum blowers can be unloaded during portions of the cycle.

When the VPSA cycle reaches a point where feed blower 22 and vacuum blower 30 are to be unloaded, unload valves 54 and 56 are opened and feed valves 26, 28 and exhaust valves 34, 36 are closed. When this occurs, vacuum blower 30 operates in a recirculation mode, while feed blower 22 discharges its gas (during unload), via unload valve 54, into the recirculation loop employed by vacuum blower 30 (i.e. vacuum blower 30, conduit 60, vacuum silencer 58, unload valve 56 and exhaust conduit 32).

The system of FIG. 1, when in the unload state, is typically operated with unload valves 54 and 56 open and third unload valve 62 closed. Under certain plant design conditions related to conduit sizing, it may be beneficial to also open third unload valve 62 in the unload state if a further pressure drop in the unload conduits can be achieved. The additional reduction in overall pressure drop will result in additional power savings.

The system of FIG. 1, when in the unload state, can be operated with the bed feed and vacuum valves in a closed condition. Under certain plant design conditions related to conduit sizing, it may be beneficial to open these valves if a further reduction in pressure drop in the unload conduits can be achieved. This additional reduction in pressure drop will result in additional power reductions. In such case, feed and vacuum valves 26,34 and/or 28,36 would be opened in addition to the opening of unload valves 54,56 and 62. Further, first unload valve 54 may be eliminated from the system if the feed and vacuum valves are opened as described.

The opening of the bed valves requires a design of the control system that maintains the appropriate pressure levels in the beds during the unload period. Those pressure levels are controlled to be equal to the unload pressure to eliminate any flow into or out of the adsorbent beds. The opening of the feed and vacuum valves to augment pressure reduction in the unload conduits can be employed in single and multi-bed systems.

As an example of how turndown/unload is achieved in a 60-ton per day oxygen VPSA system, during normal cycle operation at full production, first and second unload valves 54, 56 and third unload valve 62 are closed. During unload, third unload valve 62 is opened to unload feed blower 22, while unload valves 54 and 56 are kept closed. During turndown periods, unload valves 54 and 56 are opened, while unload valve 62 may or may not be opened as described above. The unload discharge pressure drop for feed blower 22 is 0.5 psi, while the vacuum unload suction pressure drop is 1.0 psi for the less preferred system of FIG. 2. Through implementation of the invention as depicted in FIG. 1, the feed unload discharge pressure drop reduces to 0.2 psi, while the vacuum unload suction pressure drop is 0.3 psi. If plant flow is reduced to 66% of full flow, the reduction in power consumption is calculated to be 5.0%.

The improvement under turndown conditions results from the manner in which turndown control is implemented. When customer demand is low, the system reacts by unloading its machinery and idling the cycle for a period of time in inverse proportion to the customer demand rate. Significant reductions in flow, therefore, accentuate the benefits of the invention as the amount of time that the machines are unloaded constitutes a larger fraction of the entire cycle time. This improvement in power consumption, for example at 33% of full flow, is 10%.

Energy recovery aspects of this invention that are achieved by utilization of the expanding feed stream from feed blower 22 can be practiced independently from the vent energy reduction aspects of the invention (achieved through the use of unload valves 54 and 56 and other valves, as described above). Such energy recovery system is applicable to any cycle which produces an expanding air stream through a feed blower.

Figure 2:
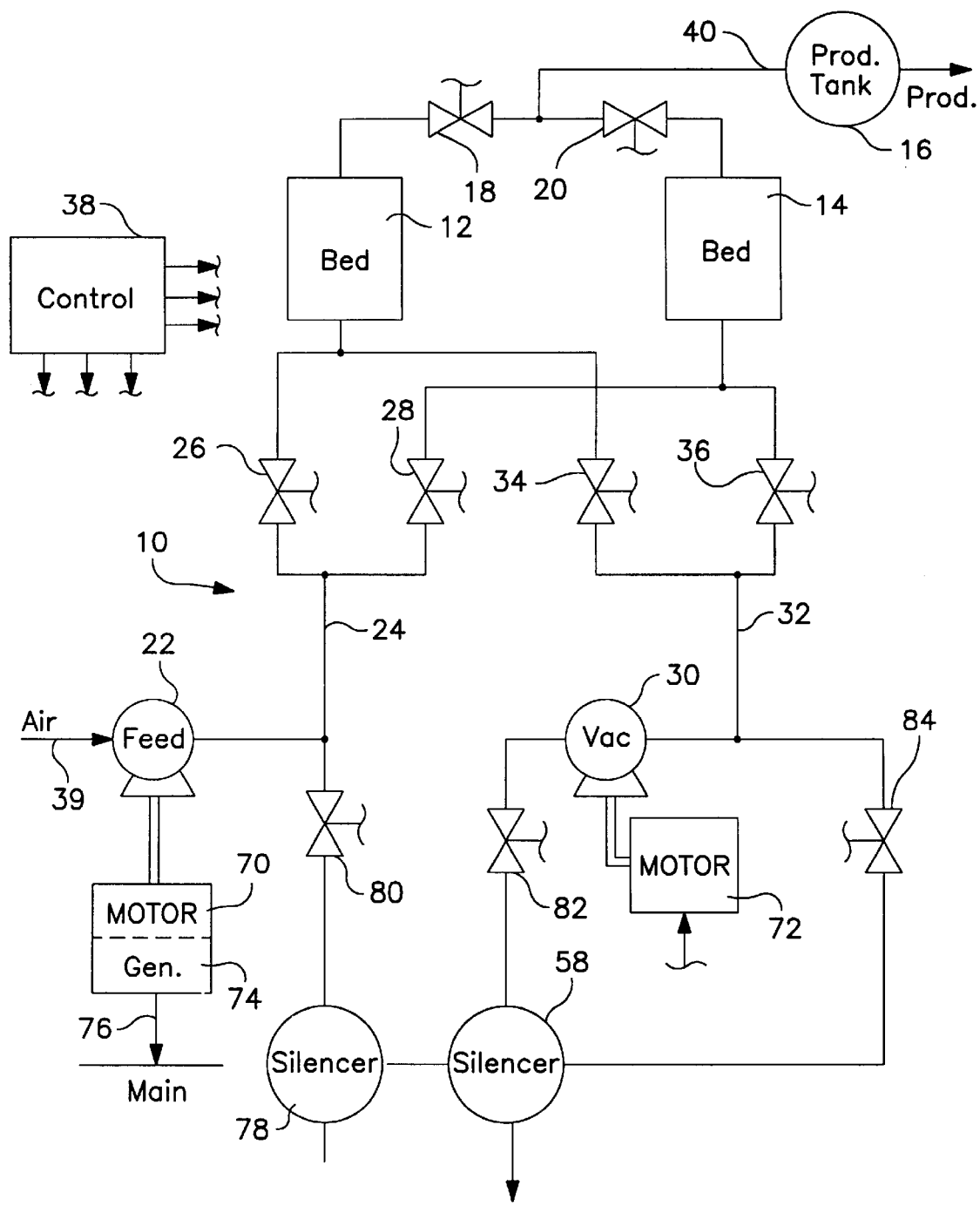
FIG. 2 is a block diagram of a VPSA system which embodies a less preferred version of the invention.

Turning now to FIG. 2, a less preferred embodiment of the invention is illustrated wherein feed blower 22 and vacuum blower 30 are powered by independent motors 86 and 72, respectively. In this instance, however, motor 86 includes a generator component 74 whose output is coupled to the electrical main via conductor 76. A silencer 78 is coupled to feed blower 22 via feed unload valve 80.

Vacuum blower 30 is coupled to a silencer 58 via a vacuum unload valve 82 and exhaust conduit 32 is coupled to silencer 58 via exhaust valve 84. When pressure in one adsorbent bed, in a vacuum condition, is rising in pressure and in another bed, in a vacuum condition, is falling in pressure, controller 38 connects feed blower 22 to the adsorbent bed that is under vacuum condition and rising in pressure. At such time, the expansion energy experienced by feed blower 22 is transferred via motor 86 to generator 74 which feeds power into the main, via conductor 76. Accordingly, an energy credit is accumulated.

At the same time (or at some other time), vacuum blower 30 operates to remove a gas from the bed which is in a pressure falling state. Under such conditions, the input energy to motor 72 can be supplied partially from the energy generated by generator 74 or can be taken, in its entirety from the main, with the credit previously obtained being utilized to offset the costs of the input energy. In such manner, energy savings are achieved. It is to be understood, however, that this system is less efficient than the most preferred system depicted in FIG. 1 as a result of the mechanical-electrical-mechanical transformations which are required, with their inherent energy losses which reduce the overall energy savings.

It should be understood that the foregoing description is only illustrative of the invention. Various alternatives and modifications can be devised by those skilled in the art without departing from the invention. Accordingly, the present invention is intended to embrace all such alternatives, modifications and variances which fall within the scope of the appended claims.

What is claimed is:

1. A process for the separation of a less adsorbable component from a gas mixture comprising said less adsorbable component and a more adsorbable component, said process comprising an adsorption/desorption cycle having the following steps:

a) passing said gas mixture through at least a first adsorbent bed and a second adsorbent bed, each containing an adsorbent material capable of selectively adsorbing said more adsorbable component at an upper adsorption pressure, whereby said more adsorbable component is adsorbed onto said adsorbent material;

b) desorbing said more adsorbable component from said adsorbent material wherein said process uses a vacuum pressure swing adsorption (VPSA) apparatus comprising:

said first adsorbent bed, said second adsorbent bed, said separation process operative during a predetermined process time, to cause said first adsorbent bed to be poised for evacuation at a pressure which requires an input of energy to a coupled vacuum blower to accomplish said evacuation, and said second adsorbent bed is under a vacuum condition and is poised for pressurization;

feed blower means for providing a flow of said gas mixture from a source at about atmospheric pressure, via a feed conduit to either said first adsorbent bed or said second adsorbent bed;

vacuum blower means for removing a flow of gas, via an exhaust conduit, from either said first adsorbent bed or said second adsorbent bed and venting said gas via vent means to a space at atmospheric pressure;

a motor coupled to said feed blower means and said vacuum blower means via a common coupling for operating both thereof;

two conduit/valve means, operative during at least a portion of said predetermined process time, one between said first adsorbent bed and an output product tank, and one between said second adsorbent bed and said output product tank, said conduit/valve means being connected to a common conduit adjacent to and in connection with said output product tank; and conduit/valve means, operative during at least a portion of said predetermined process time, for coupling said feed blower means to said second adsorbent bed and for concurrently coupling said vacuum blower means to said first adsorbent bed, whereby said feed blower means is caused to operate alternatively in a gas compression mode or in a gas expansion mode and whereby when said feed blower means is operating in said gas expansion mode it imparts expansion energy via said common coupling to said vacuum blower means.

2. The process of claim 1, wherein said less adsorbable component is oxygen.

* * * * *